June 16, 1925.
E. E. WEMP
CLUTCH DISK
Filed Feb. 15, 1924
1,541,883
2 Sheets-Sheet 2
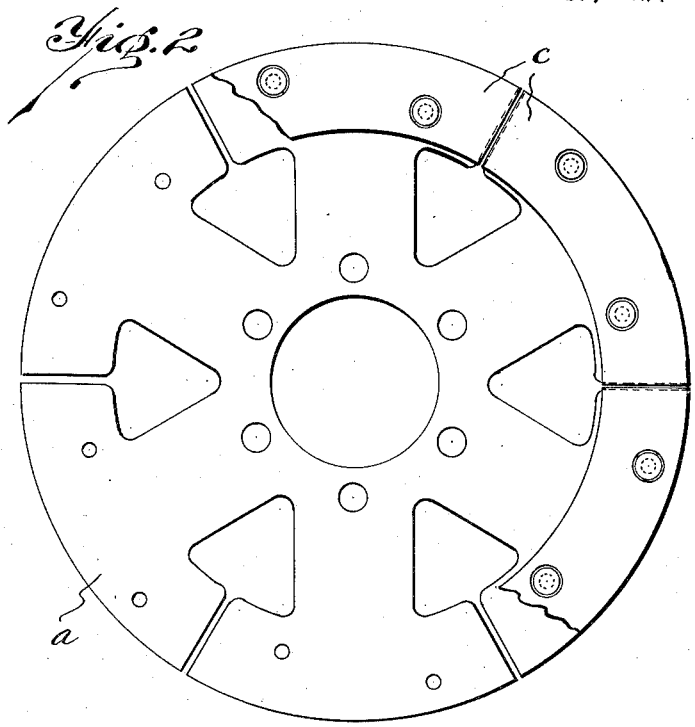
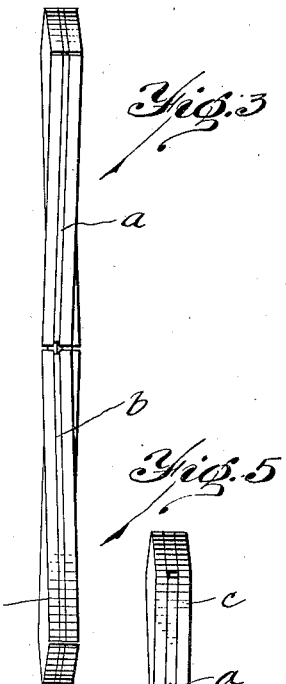
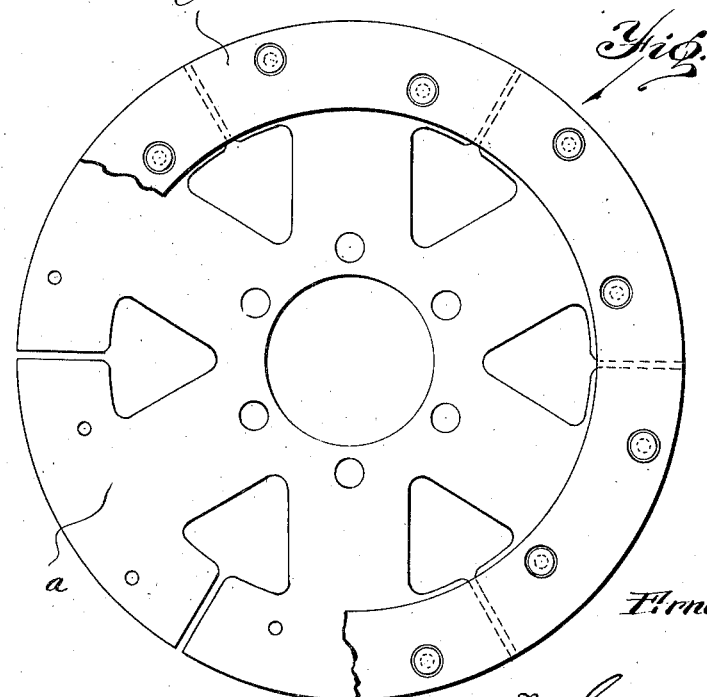
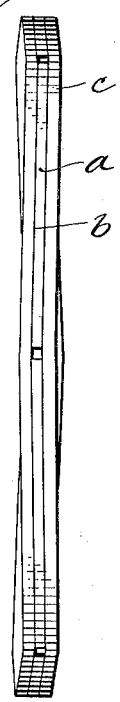
Inventor
Ernest E. Wemp
By Stuart C. Barnes
Attorney Patented June 16, 1925.

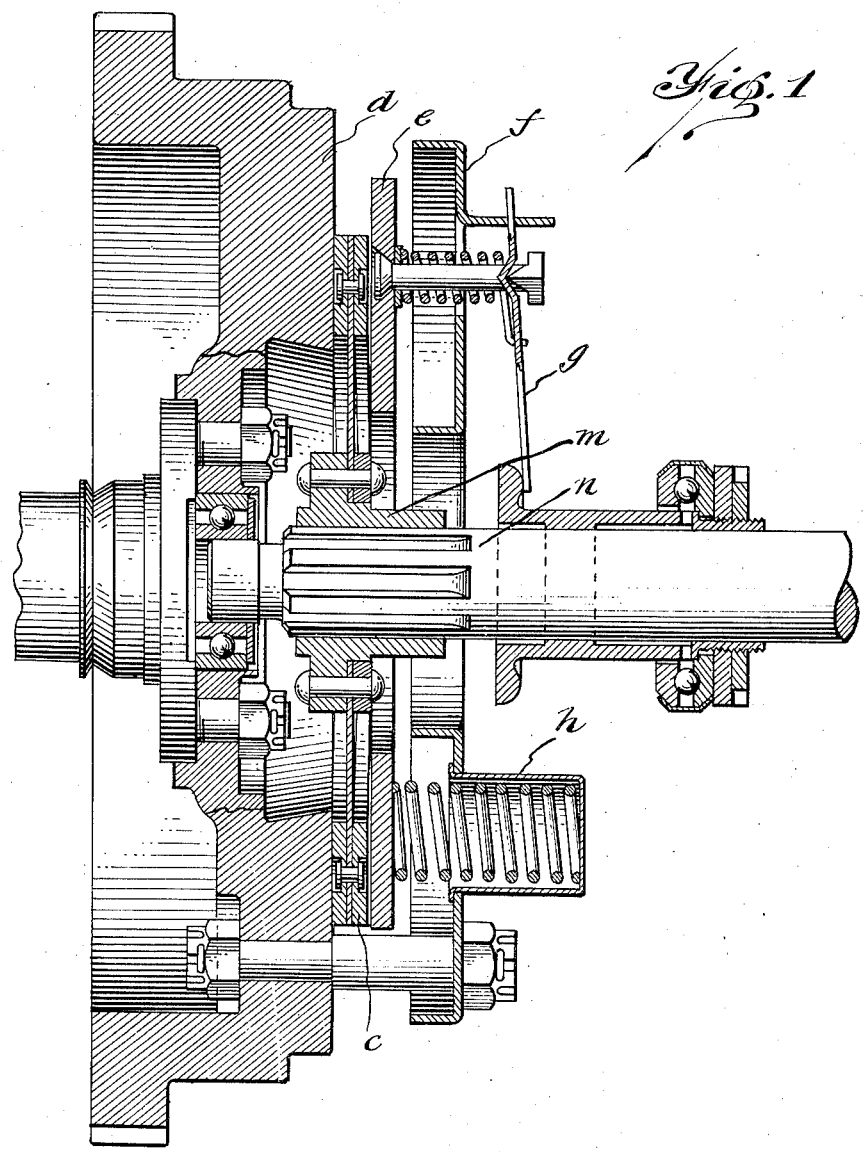

1,541,883

UNITED STATES PATENT OFFICE.

ERNEST E. WEMP, OF DETROIT, MICHIGAN.

CLUTCH DISK.

Application filed February 15, 1924. Serial No. 693,054.

*To all whom it may concern:*

Be it known that I, ERNEST E. WEMP, a citizen of the United States, residing at Detroit, in the county of Wayne and State of Michigan, have invented certain new and useful Improvements in Clutch Disks, of which the following is a specification.

This invention relates to clutches and has for its object a clutch having an improved disk construction. In my U. S. Patent No. 1,485,319, I have described and claimed a spoked disk construction for clutches which permits the driven disks to flex slightly when the same are packed or unpacked. The disks described in my prior application I arranged to flex transversely of the spokes. It is the object of the present invention to provide a flexible disk construction in which the driven disk has spokes that are permanently slightly twisted along the axis of the spoke.

In my prior application these disks were made locally flexible transversely of the spokes so as to make the clutch adaptable to variations and misalignments of the driving and driven shafts. With my improved disk construction, I not only accomplish this result, but I accomplish two additional results, to wit: I make the clutch so that it has permanent high and low portions whereby there is a gradual and progressive engagement and increase of the contact area. This makes for a smoother, easier clutch action. The second new result that I accomplish is to so distribute the bending strains that an inferior grade of metal may be used in the construction of the disks. This will be more fully explained below.

In the drawings:

Fig. 1 is a longitudinal section of a clutch embodying my improved disk.

Fig. 2 is an elevation of one of the driven disks.

Fig. 3 is an elevation looking at its edge.

Fig. 4 is an elevation of a modified form of disk.

Fig. 5 is an elevation of the same looking at the edge.

In the spoked disk construction described and claimed in my U. S. Patent No. 1,485,- 319, the bending strains are largest at the base of the spoke and taper off toward the outer end. The disk construction in general design is the same as shown in Fig. 2 of the present application and the spokes flex transversely for the purpose of being engaged or disengaged. With a large part of the bending stresses concentrated at the base of the spoke, it is necessary to make the disk of a higher grade of steel than is necessary in the invention that I am now about to describe. In my prior construction, I did in a measure distribute some of the bending stresses to points of the spoke removed from the base by reason of making the spokes of substantially uniform cross section for the entire length of the spoke, as distinguished from merely using radial segments made by radial slots. But as stated, still a large portion of the bending stresses on the metal were near the base line of the spoke. Now, it would be possible to make the bending stresses evenly distributed along the entire length of the spoke by very materially narrowing the breadth of the spoke near its outer end and then giving it a gradually increasing cross section towards its base. However, the spoke would then not be strong enough to carry the torsional load unless made of such heavy metal as to be out of the question.

However, I find that I can better accomplish my object of an even strain on the metal by having the distortion of the disk parts take place in the way of a torsional or twisting movement. This makes the strain uniform throughout the length of the spoke. In calculating the strains where the spoke is bent transversely of its length, the bending moment equals the pressure times the length, the strain increasing to maximum at the base of the spoke. In calculating the action of the twisting spoke, the torsional moment, and the strain is uniform throughout the length. In other words, the strain diagram of the spoke that bends transversely is in the form of a triangle with the apex of the triangle at the outer end of the spoke, and the strain diagram of my improved spoke, which works on the torsion principle, is a rectangle with the strain equal at all points along the length. I also find that with a twisted spoke I can give high and low spots to the clutch facing so as to get a progressive engagement for the clutch parts that contributes very materially to its smoothness.

To this end, I give each spoke a slight twist along its axis. This will be evident from an inspection of Fig. 3. The upper spoke $a$ is here twisted slightly clockwise from the natural position, and the spoke $b$ counter-clockwise from the natural position. This gives a peak between the two spokes on one side of the disk, and a valley on the other side of the disk, and so on around the disk. Preferably, I twist the spokes alternately in opposite directions so as to get these adjoining peaks and valleys, although it will be obvious that they could all be twisted in the same direction. The action, however, would not be as satisfactory from some points of view.

In order to prevent the clutch facing c from returning the spokes to a flat position, I slot the facing between the spoke heads as shown in Fig. 2. However, if a strong, heavy metal disk is used as shown in Fig. 4, it will not be necessary to cut the facings between the spokes but it may be continuous, as shown in this figure. A disk of this kind makes an admirable disk for a single driven-disk clutch construction such as shown in Fig. 1, although of course, it may be used in clutches where a plurality of driven disks are used.

In Fig. 1, the fly wheel face d represents one of the driving disks; e the other driving disk; f the abutment ring or cover plate; g the release-thrust transmitting levers; h the clutch spring, of which there will be several. Preferably, the driven disk floats between the driving disks; that is, it is mounted on a sliding collar m, which has a sliding splined arrangement with the driven shaft n. Hence, the only distortion that takes place is the twisting of the segments back to the common plane when the disks are packed and the resumption of the distorted arrangement when the disks are released. These flexing strains, as previously shown, are distributed equally over the cross section of the spoke from one end to the other, and consequently there is no local concentration of large stresses calculated to fatigue the metal. I can therefore use an inferior grade of metal in the construction of these disks which will materially cheapen the clutch.

In Fig. 1 I have shown only one form of clutch assembly, in which a disk of this character can be used. It will be obvious that a disk of this character has a wide application in almost any clutch construction employing disks. I have simply illustrated the construction shown in Fig. 1 by way of example.

What I claim is:

1. A clutch disk, comprising a sheet metal plate slotted from its periphery toward its center to form a plurality of segments, said segments being permanently twisted each as an entire unit along radial lines.

2. A clutch disk, comprising a plate slotted inwardly from the periphery to form segments, the said segments as entireties being alternately deformed in opposite directions to form alternate peaks and valleys along the face of the plate.

3. A clutch disk, comprising a plate divided into spokes by slots enlarging from the center outward, each of the spokes being permanently twisted along a radial line.

4. A clutch disk, comprising a plate divided into spokes by slots which increase in width from the center to the outside of the disk, the spokes being alternately twisted in opposite directions on radial lines to provide alternate peaks and valleys on the face of the disk.

5. A clutch disk, comprising a plate divided into a plurality of spokes having enlarged heads, a clutch facing secured to the enlarged heads of the spokes, and each of the spokes being twisted along a radial line.

6. A clutch disk, comprising a plate divided into a plurality of spokes having large portions near the outer ends that nearly contact each other, and a clutch facing on said larger outer portions divided to provide separate portions for each spoke, each of the spokes being twisted on a radial axis.

7. A clutch disk, having slots forming spoke portions permanently distorted to provide peaks and valleys on the face of the disk, said clutch disk being arranged to be flattened out when the clutch parts are packed together.

8. A clutch disk, comprising a plate of spring metal divided by a plurality of inwardly enlarging slots into a plurality of spoke portions which are permanently distorted out of a flat plane and arranged to be substantially returned to the flat plane when the clutch parts are packed together.

9. A clutch disk, comprising a plate divided into a plurality of spoke portions by slots, the portions being permanently distorted out of a flat relation, and a clutch facing covering the outer portion of said spoke portions whereby the clutch engagement is gradual and the distorted portions returned to substantially flat relation when the clutch parts are packed together.

In testimony whereof I have affixed my signature.

ERNEST E. WEMP.